May 12, 1964  J. D. PORTER ETAL  3,133,215
DYNAMOELECTRIC MACHINES
Filed Jan. 5, 1961

WITNESSES:
Leon M. Garman
James T. Young

INVENTORS
Jefferson D. Porter and
Sigrud R. Petersen.
BY E. H. Liss
ATTORNEY

United States Patent Office 3,133,215
Patented May 12, 1964

3,133,215
DYNAMOELECTRIC MACHINES
Jefferson D. Porter, Monroeville, and Sigrud R. Petersen, North Huntingdon Township, Westmoreland County, Pa., assignors to Westinghouse Electric Corporation, East Pittsburgh, Pa., a corporation of Pennsylvania
Filed Jan. 5, 1961, Ser. No. 80,893
4 Claims. (Cl. 310—51)

The present invention relates to an armature core for a dynamoelectric machine and more particularly to an improved construction for an armature core utilizing herringbone-skewed core slots.

A major cause of frame or stator vibration is the pulsating force acting on the poles as a result of a periodic alternation of magnetic reluctance between each pole and the slotted armature. The flux changes causing cyclic forces which result in noise and vibration are caused by the abrupt profiles of the poles and the armature teeth and slots. A pulsating magnetic force follows the periodicity of the armature slots that move past the pole. These forces will be transmitted elastically throughout the stator. In submarine motors which have very light frames and thus are apt to be noisy, the problem is of special interest since such noise may be picked up by enemy sound detectors.

There are four modes of vibration which contribute significantly to the production of noise due to the changing flux pattern in a dynamoelectric machine effected by rotation of the rotor teeth with respect to the pole. If the number of rotor teeth per pole is an integer, the poles vibrate parallel to themselves in a radial direction while the frame will alternate between the purely extended and compressed states. This is the first mode of vibration. The second significant mode of vibration occurs if the number of rotor teeth per pole are not integers. In this mode, the motion of the individual poles is the same as previously described but the consecutive poles are 180 degrees out of phase and the frame is in bending. There is also a component of force in the tangential direction which tends to rock the poles about an axis parallel to the axis of rotation. It has been found that by skewing the slots or teeth of the armature with respect to the axis of rotation by one full pole pitch, these first three modes of vibration are eliminated but a fourth significant mode of vibration is introduced. In this mode, the teeth rock about their transverse axis and the frame is in combined twist and bending. In this case, the normal and tangential forces in any one instance vary from point to point along the length of the pole. In order to avoid this mode of vibration, herringbone-skewed slots have been designed where the slope of the teeth is at the rate of one full tooth pitch over half the rotor length. A herringbone-skewed rotor sloped a full tooth pitch over the rotor length will make the frame free from vibration in any of the four modes above described independent of the number of teeth per pole.

However, although the herringbone-skewed slots overcome or markedly reduce the noise and vibration problem, certain other problems in the physical construction of the rotor result as a consequence of skewing the slots in this manner. For example, at the ends of the core are disposed a plurality of radially extending ventilation fingers of substantial width. These fingers are disposed circumferentially around the core with a finger adjacent each tooth. With a deep pitch skew which extends one full pole pitch for half the rotor length, the ventilation fingers are likely to interfere with the coil extensions. At the center of the core where the herringbone skews change in direction, the coil must follow the slot resulting in a relatively sharp bend at this point. Such a bend thickens the insulation at this point and requires a substantial longitudinal distance in which to make the bend since the coil cannot be bent sharply without having ill effects on the insulation and its electrical characteristics. Thus, more space is needed at this bending point to provide room for the thickened insulation and the extensive bending area. One solution to this problem would be an expensively machined spacing wheel which would complicate ventilation and coil clearances. It would also result in increased core length. This would be an undesirable method. Another problem would be the effect of the wide slot at the center and vibration and noise effect.

In the present invention these problems are solved by providing ventilation fingers at the ends of the core which are twisted for the depth of the slot so as to lie parallel to the sides of the slot thereby being adapted to accommodate the coil ends. At the center of the core where the skewed slots reverse their direction laminations with widened slots are provided thereby increasing the slot width at this point. These laminations are also of reduced diameter. The reduction in the diameter of the laminations adjacent the center of the skewed slots minimizes the effect of these laminations on the flux pattern by effectively increasing the air gap between the stator and the rotor. Intermediate the center two laminations of increased slot width and decreased diameter is inserted a ventilation plate having ventilation fingers. The ventilation fingers are welded to the adjacent laminations.

The principal object of the present invention is to provide an improved core construction for a dynamoelectric machine which utilizes herringbone-skewed slots to reduce noise and vibration.

Another object of the present invention is to provide an improved herringbone-skewed construction for a dynamoelectric machine which is economical and provides sufficient space to accommodate the bending radius of the coil as well as the build up of insulation around the bend.

A further object of the present invention is to provide an improved herringbone-skewed core construction for a dynamoelectric machine which provides sufficient space to accommodate the bending radius of the core as well as the build up of insulation around the bend while maintaining a minimum length core and maximum noise reduction characteristics.

Other objects and advantages of the invention will be apparent from the following detailed description taken in connection with the accompanying drawings in which.

Figure 1:
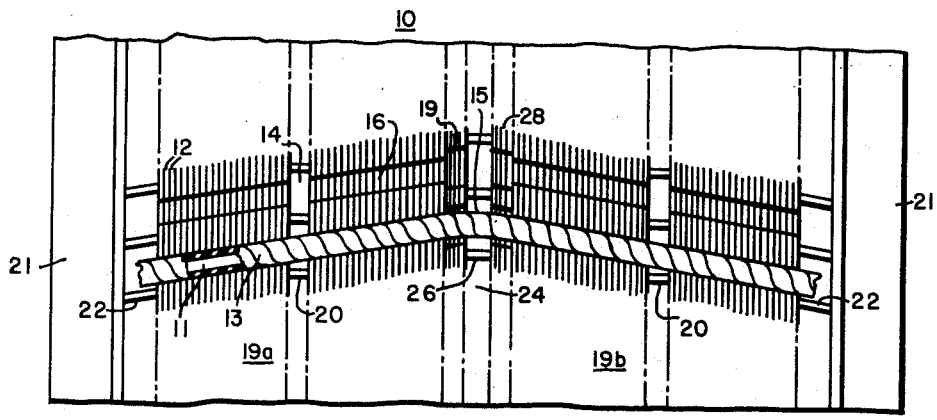
FIGURE 1 is a fragmentary longitudinal view of the dynamoelectric machine incorporating this invention.
Figure 2:
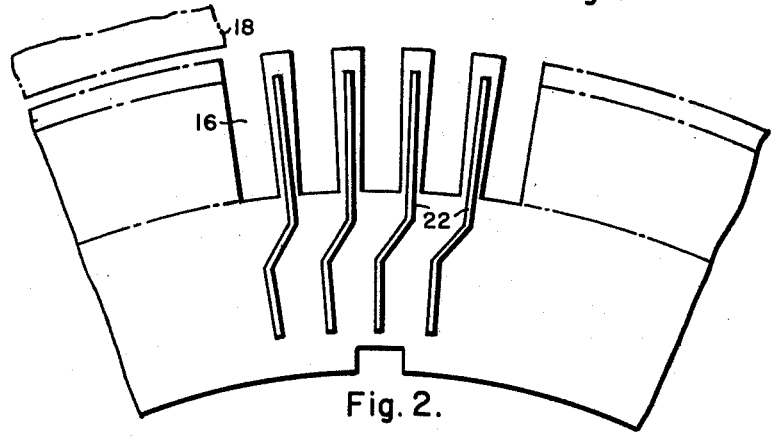
FIGURE 2 is a fragmentary elevational view of an end vent finger and punching assembly for a rotor embodying this invention.
Figure 3:
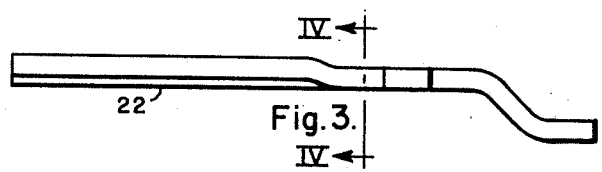
FIGURE 3 is a side elevational view of a ventilation finger employed in this invention; and, FIGURE 4 is a sectional view on line IV—IV of FIG. 3 showing the twist of the end finger of this invention.
Figure 4:

As shown in FIG. 1, the invention is applied to a dynamoelectric machine which has a rotor core 10 comprising laminations 12 assembled together in groups or stacks with radial ventilating ducts 14 therebetween. The rotor core 10 has a plurality of generally axial or longitudinal slots 16 which will be described in detail hereinafter. The rotor core 10 carries the coils 11 having insulation 13 thereon of a D.C. armature. The stator member 18 carries the field poles of a D.C. machine. The stator 18 is shown fragmentarily as it forms no part of the present invention. The ventilating spaces 14 between groups of laminations 12 are formed by ventilating fingers 20 which lie between and are secured to adjacent laminations. The core is held together by end plates 21, and between the end plates 21 and the laminations are ventilating fingers 22. The laminations 12 are offset with respect to each adjacent lamination so as to provide a herringbone-skewed core slot. Each slot 16 is skewed in one sense for one full pole pitch over one-half the length of the rotor core 10 to provide a skewed portion 19a and in the opposite sense for one full pole pitch over the other half the length of the rotor core 10 to provide a skewed portion 19b. The skewed portions 19a and 19b meet at a junction 24 at substantially the center of the rotor core 10. Intermediate the skewed portion 19a and the skewed portion 19b of each slot 14 are a plurality of radially extending ventilating fingers 26 circumferentially spaced around the rotor core. A plurality of laminations 28 on each side of the ventilating fingers 26 are of reduced diameter and reduced tooth width so as to provide a smaller diameter in this area and a wider slot. The laminations 28 on each side of the junction 24 have secured thereto the ventilating fingers 26. The fingers may be secured to the laminations as by welding or any other suitable or desirable means. The ventilating fingers 22 at the ends of the core are twisted as can be seen in FIGS. 3 and 4 adjacent their outer ends for a distance equivalent to the depth of the slots 16 so as to lie parallel to the side walls of the slots thereby accommodating the coil ends. These fingers would otherwise interfere with the coil ends. The widened portion 19 of the slots 16 adjacent the junction 24 is provided to accommodate the bending radius of the coils. It should also be noted that adjacent and at the bending radius the insulation 13 builds up as at 15 due to the bending of the coil. Thus, the widened slot portion 19 accommodates the bending radius of the coil and the built-up insulation.

The herringbone-skewed slots 16 reduce noise and vibrations due to the changing flux upon rotation of the skews relative to the poles of the machine. However, the widened slot portion 19 at the junction 24 may affect the noise reduction characteristics of the machines. To minimize this effect, the laminations 28 adjacent this junction 24 have been made of reduced diameter so as to increase the effective air gap between the stator and the rotor thereby minimizing the effect of the increased slot width.

It should now be apparent that a dynamoelectric machine has been provided which is relatively free from noise and vibration due to the changing flux pattern due to the rotation of the rotor relative to the poles of the stator. This has been accomplished by the use of herringbone-skewed slots. The difficulties arising in placing the coils in herringbone-skewed slots have been eliminated by the unique construction of this inventioin wherein a widened slot portion 19 is provided at the bending radius of the coil to accommodate the bending radius and the insulation build up due to the bend in coil. The ventilation fingers at the ends of the core have been constructed so as to accommodate the coil ends. These results are obtained without increasing the cost of the machine, without making the core longer than the standard core, and without introducing any new noise producing elements.

A preferred embodiment of the invention has been shown and described for the purpose of illustration, but it will be apparent that various modifications may be made within the scope of the invention and that the rotor described herein is applicable to dynamoelectric machines of various types. It is to be understood, therefore, that the invention is not limited to the specific details of construction shown, but includes all equivalent embodiments and modifications.

We claim as our invention:

1. A dynamoelectric machine including a core having a plurality of circumferentially spaced slots, each slot having a portion skewed in one direction and a portion skewed in the opposite direction to form a herringbone-skewed slot, said skewed portions meeting at a junction intermediate the ends of the core, said slots being of increased width and said core being of reduced diameter at and adjacent said junction, and insulated windings lying in said slots.

2. In a dynamoelectric machine, an armature core comprising a plurality of laminations each having a plurality of circumferentially spaced teeth, said laminations being disposed in a stack and secured together, the teeth of the laminations being offset with respect to teeth of adjacent laminations to form herringbone-skewed slots in said core, said slots having a portion skewed in one sense and another portion skewed in an opposite sense, said skewed portions meeting at a junction intermediate the ends of the core, the laminations at and adjacent said junction having teeth of decreased width to provide increased slot width adjacent the junction, said laminations at and adjacent the junction being of reduced outer diameter, and insulated windings lying in said slots.

3. In a dynamoelectric machine, an armature core comprising a plurality of laminations each having a plurality of circumferentially spaced teeth, said laminations being disposed in a stack and secured together, the teeth of the laminations being offset with respect to teeth of adjacent laminations to form herringbone-skewed slots in said core, said slots having a portion skewed in one sense and another portion skewed in an opposite sense, said skewed portions meeting at a junction intermediate the ends of the core, the laminations at and adjacent said junction having teeth of decreased width to provide increased slot width adjacent the junction and said laminations at and adjacent the junction being of reduced outer diameter, insulated windings lying in said slots, radially extending ventilation fingers secured at the ends of said core, said fingers being twisted at their outer ends so as to be parallel to the side walls of adjacent slots.

4. In a dynamoelectric machine, an armature core comprising a plurality of laminations each having a plurality of circumferentially spaced teeth, said laminations being disposed in a stack and secured together, the teeth of the laminations being offset with respect to teeth of adjacent laminations to form herringbone-skewed slots in said core, said slots having a portion skewed in one sense and another portion skewed in an opposite sense, said skewed portions meeting at a junction intermediate the ends of the core, the laminations at and adjacent said junction having teeth of decreased width to provide increased slot width adjacent the junction, said laminations at and adjacent the junction being of reduced outer diameter, insulated windings lying in said slots, radially extending ventilation fingers secured at the ends of said core, said fingers being twisted at their outer ends so as to be parallel to the side walls of said adjacent slots and other radially extending ventilation fingers disposed intermediate a pair of adjacent laminations adjacent said junction.

References Cited in the file of this patent

UNITED STATES PATENTS

| | | |
|---|---|---|
| 1,241,503 | Field | Oct. 2, 1917 |
| 1,861,059 | Johnson | May 31, 1932 |
| 2,176,871 | Harrell et al. | Oct. 24, 1939 |